(12) United States Patent
Shimada et al.

(10) Patent No.: US 12,353,108 B2
(45) Date of Patent: Jul. 8, 2025

(54) LIQUID CRYSTAL OPTICAL ELEMENT

(71) Applicant: Nissan Motor Co., Ltd., Yokohama (JP)

(72) Inventors: Maki Shimada, Kanagawa (JP); Yoshimi Ohta, Kanagawa (JP); Fuminori Satou, Kanagawa (JP); Shunta Nabetani, Kanagawa (JP); Masao Yoshida, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/837,214

(22) PCT Filed: Dec. 19, 2022

(86) PCT No.: PCT/JP2022/046719
§ 371 (c)(1),
(2) Date: Aug. 9, 2024

(87) PCT Pub. No.: WO2023/157453
PCT Pub. Date: Aug. 24, 2023

(65) Prior Publication Data
US 2025/0172845 A1    May 29, 2025

(30) Foreign Application Priority Data
Feb. 15, 2022    (JP) .................... 2022-021501

(51) Int. Cl.
G02F 1/137    (2006.01)
(52) U.S. Cl.
CPC ............... G02F 1/13756 (2021.01)

(58) Field of Classification Search
CPC ............ G02F 1/13756; G02F 1/13345; G02F 1/133362; C09K 19/3086; C09K 19/586; C09K 2019/0448
See application file for complete search history.

(56) References Cited

FOREIGN PATENT DOCUMENTS

| JP | 2011-154388 A | 8/2011 |
|---|---|---|
| JP | 2021-26183 A | 2/2021 |

OTHER PUBLICATIONS

Rajaram, C. V. et al. Effect of Polymerization Temperature on the Morphology and Electrooptic Properties of Polymer-Stabilized Liquid Crystals. Chem. Matter., Oct. 15, 1996, 8, p. 2451-2460, see fig. 1, 6-8 (Year: 1996).*

(Continued)

*Primary Examiner* — James R Greece
*Assistant Examiner* — Jose M Diaz
(74) *Attorney, Agent, or Firm* — Global IP Counselors, LLP

(57) ABSTRACT

A liquid crystal optical element includes an optical function layer and two transparent substrates. The optical function layer is sandwiched between two transparent substrates. The optical function layer contains liquid crystal molecules and a photoisomerization material. The liquid crystal optical element switches between a light-transmitting state and a light-scattering state according to an orientation state of the liquid crystal molecules. The optical function layer holds the liquid crystal molecules and the photoisomerization material within a mesh structure formed of a resin-particle aggregate. Therefore, light can be strongly scattered when the liquid crystal optical element is in a screen state, and a high-contrast image is obtained when visible light is projected onto the liquid crystal optical element.

5 Claims, 5 Drawing Sheets

(56) References Cited

OTHER PUBLICATIONS

English Translation of International Preliminary Report on Patentability Chapter II (Year: 2024).*

* cited by examiner

EXAMPLE 1

AVERAGE PARTICLE DIAMETER OF RESIN PARTICLES: 1 μm

EXAMPLE 2

AVERAGE PARTICLE DIAMETER OF RESIN PARTICLES: 0.5 μm

LIQUID CRYSTAL OPTICAL ELEMENT

CROSS-REFERENCE TO RELATED APPLICATIONS

This application is a U.S. national stage application of International Application No. PCT/JP2022/046719, filed on Dec. 19, 2022, which claims priority to Japanese Application No. 2022-021501, filed on Feb. 15, 2022.

BACKGROUND

Technical Field

The present invention relates to a liquid crystal optical element, and more specifically relates to a liquid crystal optical element that switches between a transparent state in which light is transmitted through the liquid crystal optical element and a screen state in which light is scattered by the liquid crystal optical element.

Background Information

Liquid crystal optical elements are known in which an optical state switches between a transparent state in which light is transmitted through the liquid crystal optical element and a screen state in which light is scattered by the liquid crystal optical element. Visible light is projected onto a liquid crystal optical element that is in the screen state to display a visible image.

Japanese Laid-Open Patent Application No. 2011-154388 (hereinafter Patent Document 1) indicates that a plurality of columnar resins that are disposed upright in a thickness direction of the liquid crystal optical element are provided, and by reducing an area occupied by the columnar resins in a thickness-direction central section, deformation of the columnar resins is prevented and cloudiness in the transparent state can be suppressed even if shock is applied to the liquid crystal optical element.

SUMMARY

However, in the invention disclosed in Patent Document 1, the columnar resins have a smooth surface and a small area of interface with liquid crystal molecules. Therefore, there is weak scattering of light in the screen state, and a large amount of light is transmitted. Thus, in environments in which there is a large amount of exterior light, a high-contrast image will not be obtained even when visible light is projected, and usage of the liquid crystal optical element as a screen is limited.

With the foregoing problems in the prior art in view, it is an object of the invention to provide a liquid crystal optical element with which a high-contrast image is obtained due to visible light being projected thereupon and which can suitably be used as a screen even in environments in which there is a large amount of exterior light.

As a result of thorough investigations conducted in order to achieve the abovementioned object, the inventors perfected the present invention upon discovering that forming a mesh structure that holds liquid crystal molecules by using a resin having recesses and protrusions in a surface thereof makes it possible to strongly scatter light when in a screen state and to achieve the abovementioned object.

Specifically, in the liquid crystal optical element of the present invention, an optical function layer is sandwiched between two transparent substrates, the optical function layer containing liquid crystal molecules and a photoisomerization material, and the liquid crystal optical element switching between a light-transmitting state and a light-scattering state depending on an orientation state of the liquid crystal molecules. The liquid crystal optical element is configured such that the optical function layer holds the liquid crystal molecules and the photoisomerization material within a mesh structure formed of a resin-particle aggregate.

According to the present invention, the liquid crystal molecules are held by the mesh structure, which is formed of a resin-particle aggregate and which has recesses and protrusions in the surface thereof; thus, it is possible to provide a liquid crystal optical element with which light can be strongly scattered when the liquid crystal optical element is in a screen state and with which a high-contrast image is obtained when visible light is projected onto the liquid crystal optical element.

BRIEF DESCRIPTION OF THE DRAWINGS

Referring now to the attached drawings which form a part of this original disclosure, selected embodiments of this disclosure are illustrated.

DETAILED DESCRIPTION OF EMBODIMENTS

Figure 1:
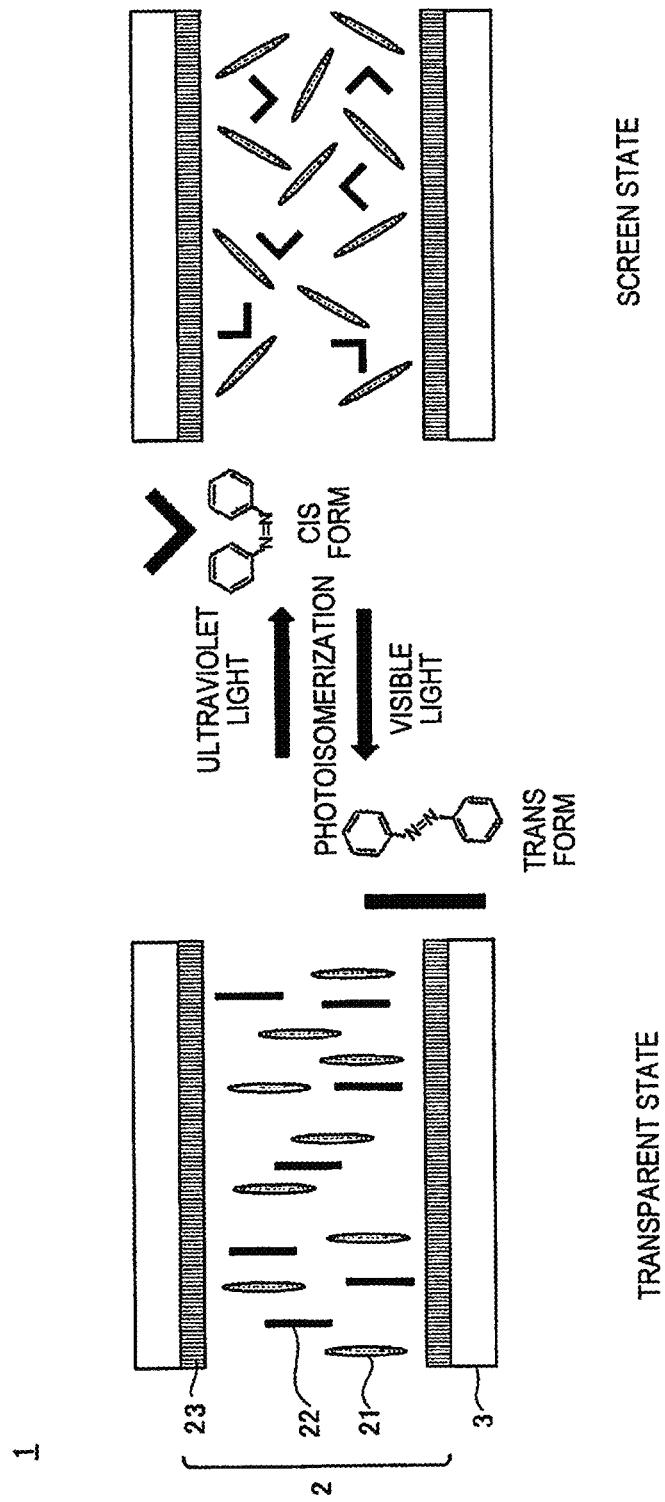
FIG. 1 is a diagram illustrating a mechanism by which a liquid crystal optical element switches between a light-transmitting state and a light-scattering state.

The liquid crystal optical element of the present invention shall now be described in detail. In the liquid crystal optical element of the present invention, an optical function layer that changes between a transparent state in which light is transmitted through the optical function layer and a screen state in which light is scattered by the optical function layer to produce a clouded appearance is sandwiched between two transparent substrates, the optical function layer containing liquid crystal molecules and a photoisomerization material, and the liquid crystal molecules and the photoisomerization material being held within a mesh structure formed of a resin-particle aggregate.

First, a mechanism by which the optical function layer transitions from the transparent state to the screen state in which light is scattered by the optical function layer to produce a clouded appearance shall be described.

The liquid crystal molecules have a rigid mesogen skeleton and flexible long-chain alkyl groups, the liquid crystal molecules being nematic liquid crystals that have optical anisotropy and dielectric anisotropy. The nematic liquid crystals have characteristics such that, in a state in which no external pressure is applied, the liquid crystal molecules, which are in the form of rods, are associated with each other and are arranged so as to have substantially fixed directionality.

The photoisomerization material is a compound that absorbs ultraviolet light or other forms of light, prompting cis-trans isomerization. In the liquid crystal optical element of the present invention, it is possible to use a material that changes in structure due to isomerization, the liquid crystal molecules becoming disarranged and assuming random orientation; for example, a compound having an azobenzene structure in which two benzene rings are bonded by azo groups (also referred to below as an azobenzene compound) can be used. Other examples of the photoisomerization material include chalcone derivatives, sulfoxide compounds, fulgide compounds, and cinnamic acid compounds.

The azobenzene compound includes compounds expressed by chemical formula (1).

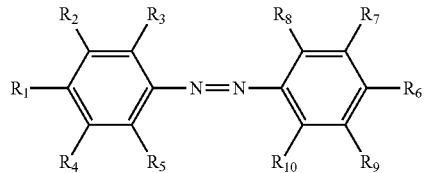

Formula 1

In chemical formula (1): $R_1$ to $R_{10}$ each independently represent a group selected from the group consisting of hydrogen atoms, substituted or unsubstituted alkyl groups, substituted or unsubstituted alkoxy groups, halogen groups, hydroxy groups, carboxyl groups, ester groups (—COOR'), and combinations of these; and R' represents a group selected from the group consisting of substituted or unsubstituted alkyl groups and substituted or unsubstituted alkoxy groups.

Examples of alkyl groups include: methyl groups, ethyl groups, n-propyl groups, n-butyl groups, n-pentyl groups, n-hexyl groups, n-heptyl groups, n-octyl groups, n-nonyl groups, n-decyl groups, n-undecyl groups, n-dodecyl groups, n-tridecyl groups, n-tetradecyl groups, n-pentadecyl groups, n-hexadecyl groups, and other straight-chain alkyl groups; and isopropyl groups, isobutyl groups, sec-butyl groups, tert-butyl groups, isoamyl groups, tert-pentyl groups, neopentyl groups, 1-methylpentyl groups, 4-methyl-2-pentyl groups, 3,3-dimethylbutyl groups, 2-ethylbutyl groups, 1-methylhexyl groups, tert-octyl groups, 1-methylheptyl groups, 2-ethylhexyl groups, 2-propylpentyl groups, 2,2-dimethylheptyl groups, 2,6-dimethyl-4-heptyl groups, 3,5,5-trimethylhexyl groups, 1-methyldecyl groups, 1-hexylheptyl groups, and other branched alkyl groups.

Examples of alkoxy groups include: methoxy groups, ethoxy groups, n-propoxy groups, n-butoxy groups, n-pentyloxy groups, n-hexyloxy groups, n-heptyloxy groups, n-octyloxy groups, n-nonyloxy groups, n-decyloxy groups, n-undecyloxy groups, n-dodecyloxy groups, n-tridecyloxy groups, n-tetradecyloxy groups, n-pentyloxy groups, n-hexadecyloxy groups, and other straight-chain alkoxy groups; and isopropoxy groups, tert-butoxy groups, 1-methylpentyloxy groups, 4-methyl-2-pentyloxy groups, 3,3-dimethylbutyloxy groups, 2-ethylbutyloxy groups, 1-methylhexyloxy groups, tert-octyloxy groups, 1-methylheptyloxy groups, 2-ethylhexyloxy groups, 2-propylpentyloxy groups, 2,2-dimethylheptyloxy groups, 2,6-dimethyl-4-heptyloxy groups, 3,5,5-trimethylhexyloxy groups, 1-methyldecyloxy groups, 1-hexylheptyloxy groups, and other branched alkoxy groups.

In cases where the alkyl groups and alkoxy groups have substituents, the introduced substituents are not particularly limited. Specific examples thereof include halogen groups, unsubstituted alkyl groups, unsubstituted alkoxy groups, and combinations of these.

The halogen groups represent fluoro groups (—F), chloro groups (—Cl), bromo groups (—Br), or iodo groups (—I).

The azobenzene compound can be a compound in which an isosorbide or an isomannide is esterified using the compound expressed by chemical formula (1).

In a preferred embodiment, the azobenzene compound is selected from the compounds expressed by chemical formulas (2) to (5).

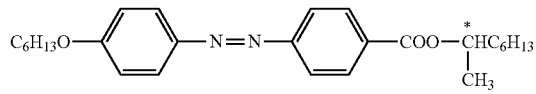

Formula 2

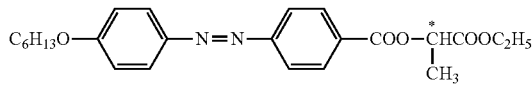

Formula 3

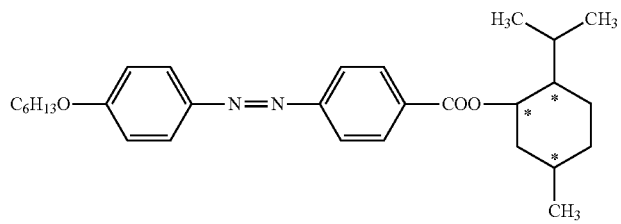

Formula 4

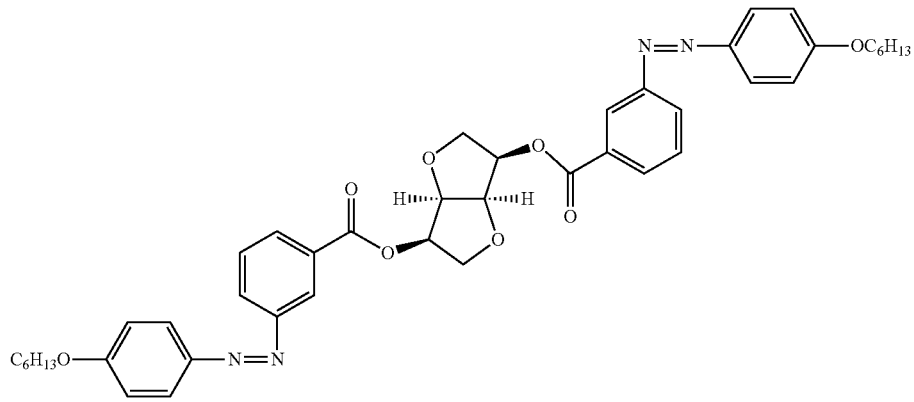

Formula 5

Examples of chalcone derivatives include compounds expressed by chemical formula (6).

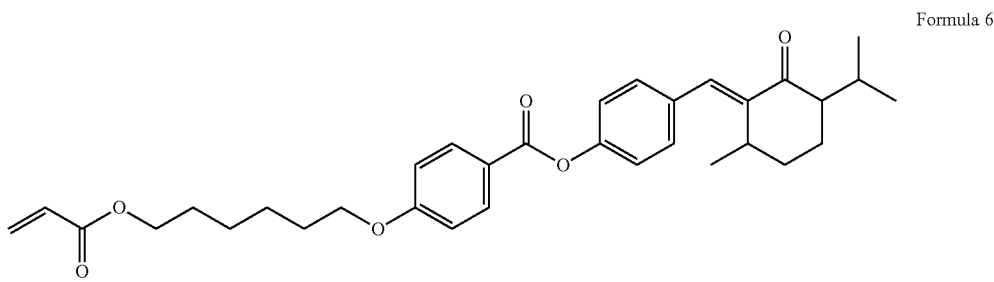 [SMILES: C=CC(=O)OCCCCCCOc1ccc(C(=O)Oc2ccc(/C=C3/C(=O)C(C(C)C)CCC3C)cc2)cc1]

Formula 6

Examples of sulfoxide compounds include compounds expressed by chemical formula (7).

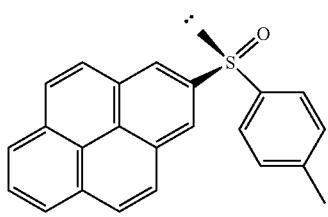

Formula 7

Examples of fulgide compounds include compounds expressed by chemical formula (8).

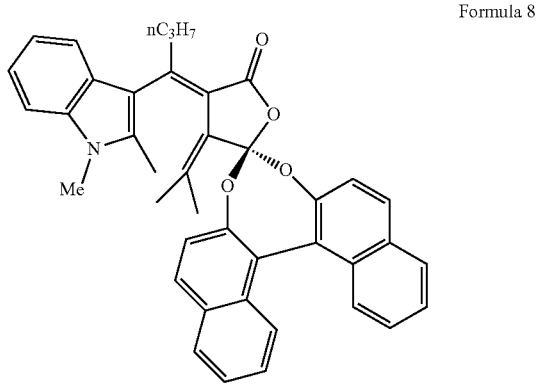

Formula 8

Examples of cinnamic acid compounds include compounds expressed by chemical formulas (9) and (10).

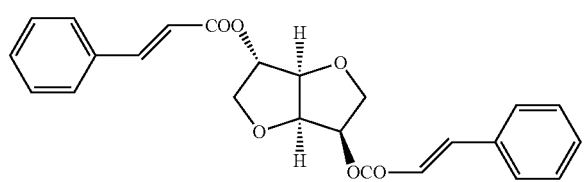

Formula 9

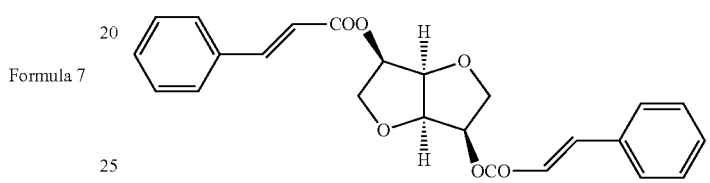

Formula 10

The photoisomerization material preferably contains the azobenzene compound, more preferably contains a compound expressed by chemical formulas (2) to (5), and even more preferably contains a compound expressed by chemical formula (5), in terms of yielding a high photoisomerization reaction velocity.

Photoisomerization materials can be used singly or in combinations of two or more.

Methods for synthesizing the photoisomerization material are not particularly limited; synthesis methods that are well known in the prior art can be applied. For example, the compounds expressed by chemical formulas (2) to (5) can be synthesized in accordance with the method disclosed in "Md. Z. Alam, T. Yoshioka, T. Ogata, T. Nonaka, S. Kurihara, 'Influence of Helical Twisting Power on Photoswitching Behavior of Chiral Azobenzene Compounds: Their Applications to High-Performance Switching Devices,' *Chem. Eur. J.*, 13, 2641-2647 (2007)."

In a preferred embodiment, the photoisomerization material constitutes an optically active material together with a non-photoreactive chiral compound. Such optically active materials are preferably used from the standpoint of further improving transparency of a dimming film in the transparent state.

A compound having optical rotation properties different from those of the photoisomerization material being used can be used as the non-photoreactive chiral compound. Using the photoisomerization material and the non-photoreactive chiral compound in combination makes it possible to achieve a compensation state in which helical twisting powers (HTPs) of the photoisomerization material and the non-photoreactive chiral compound are mutually chiral. Specifically, it is possible to further suppress disorder in the arrangement of the liquid crystal molecules caused by the twisting power of the photoisomerization material in a trans form. Thus, the transparency of the dimming film in the transparent state can be further enhanced. The HTPs can be derived through the Cano wedge method.

Examples of the non-photoreactive chiral compound include 4-[4-(hexyloxy)benzoyloxy]benzoic acid(R)-2-octyl, 4-[4-(hexyloxy)benzoyloxy]benzoic acid(S)-2-octyl, 4'-[(S)-2-methylbutyl]-1,1'-biphenyl-4-carbonitrile, bis[4-(trans-4-pentylcyclohexyl)benzoic acid](R)-1-phenyl-1,2-ethanediyl, and bis[4-(trans-4-pentylcyclohexyl)benzoic acid](S)-1-phenyl-1,2-ethanediyl.

Commercially available products or synthetic products can be used as the non-photoreactive chiral compound. Examples of commercially available products include R-811, S-811, CB15, C15, S-1011, and R-1011 (made by Merck).

In cases where an azobenzene compound is used as the photoisomerization material, the non-photoreactive chiral compound preferably includes a compound selected from 4-[4-(hexyloxy)benzoyloxy]benzoic acid(R)-2-octyl, 4'-[(S)-2-methylbutyl]-1,1'-biphenyl-4-carbonitrile, and bis[4-(trans-4-pentylcyclohexyl)benzoic acid](R)-1-phenyl-1,2-ethanediyl, and more preferably includes 4-[4-(hexyloxy)benzoyloxy]benzoic acid(R)-2-octyl.

The azobenzene changes in structure from a trans form to a cis form upon receiving ultraviolet light. Whereas the trans form of the azobenzene has a planar structure, the cis form of the azobenzene has a bent three-dimensional structure. In FIG. 1, the trans-isomer-form azobenzene is shown as being linear, and the cis-isomer-form azobenzene is shown being L-shaped. The mesh structure formed of resin-particle aggregate is not shown in FIG. 1.

When ultraviolet light has not impinged on the optical function layer, the azobenzene is a trans-form isomer having a planar structure and the liquid crystal molecules form a nematic phase that is oriented and has ordered directionality, as shown on the left side of FIG. 1. The liquid crystal molecules in the oriented nematic phase are arranged facing in a direction of being disposed upright with respect to a perpendicularly oriented film due to the perpendicularly oriented film. Therefore, the optical function layer assumes a transparent state in which light is transmitted through the optical function layer.

When the optical function layer is irradiated with ultraviolet light, the azobenzene changes to a cis-form isomer. The azobenzene changes from a planar structure to a bent structure, whereby the liquid crystal molecules become disarranged and face in random directions, as shown on the right side of FIG. 1. Therefore, the light that is incident on the optical function layer is reflected and scattered by the liquid crystal molecules, and the optical function layer assumes a clouded screen state.

In this state, the liquid crystal molecules are held within the mesh structure of the resin particle aggregate. Therefore, in addition to scattering resulting from reflection by the liquid crystal molecules, there is also geometrical scattering resulting from a difference between refractive indices of the resin particles and the liquid crystal particles at an interface of contact between the resin particles and the liquid crystal particles, and light is scattered omnidirectionally.

In the liquid crystal optical element of the present invention, the mesh structure is formed of the resin-particle aggregate, recesses and protrusions being present in the surface of the resin aggregate. Therefore, the liquid crystal molecule-resin interface where the geometrical scattering occurs has a large area, thus improving scattering intensity.

Thus, the liquid crystal optical element of the present invention has high scattering intensity, and light that is incident thereon is scattered in an approximately isotropic manner. Therefore, less of the incident light is transmitted through the optical function layer and exits on the opposite side.

Thus, the liquid crystal optical element of the present invention is capable of reducing the amount of light that is transmitted to the opposite side of the optical function layer. Therefore, when visible light is projected onto the liquid crystal optical element, less light is transmitted to the side opposite from the side onto which the visible light is projected, and more light is reflected by the side onto which the visible light is projected. The intensity of the light in images seen from the side onto which the visible light is projected thereby increases.

In bright environments, light incident from the side opposite the side onto which the visible light is projected will not be readily transmitted to said side either, and the intensity of background light seen from the side onto which the visible light is projected will decrease. Therefore, as a result of there being less of an effect from the brightness in the environment, a high-contrast projected image can be formed even in bright environments (where contrast=(image light intensity+background light intensity)/background light intensity).

The cis form of the azobenzene returns to the trans form due to being allowed to stand in visible light or being exposed to visible light. Therefore, the liquid crystal molecules also return to the original state of arrangement, and the optical function layer can be returned to a transparent state. The optical function layer of the present invention returns to the transparent state due to being irradiated with visible light, but applying an electrical field to the optical function layer makes it possible to return the optical function layer to the transparent state more quickly.

The optical function layer can be created by mixing the liquid crystal molecules, the photoisomerization material, and a photopolymerizable monomer having a biphenyl structure, and adding a polymerization initiator to polymerize the photopolymerizable monomer having the biphenyl structure.

For example, 4,4'-bis[4-{6-(acryloyloxy)hexyloxy}benzoate]-1,1'-biphenylene, 4,4'-bis[6-(acryloyloxy)hexyloxy]biphenyl, 6-[{4'-cyano-(1,1'-biphenyl)-4-yl}oxy]hexyl acrylate, or the like can be used as a liquid-crystalline resin in the photopolymerizable monomer. Additionally, it is also possible to use, e.g., NOA65 (made by Norland) or another monomer composed of resin nanoparticles in which the surfaces are coated with non-liquid-crystalline resin.

4,4'-bis[6-(acryloyloxy)hexyloxy]biphenyl has a biphenyl structure and high affinity with liquid crystal molecules, and thus, even when mixed with the liquid crystal molecules, polymerizes while remaining mixed with the liquid crystal molecules without undergoing phase separation to form the resin-particle mesh structure. Therefore, it is possible to form an optical function layer in which the liquid crystal molecules are held entrained within the mesh structure.

The resin particles preferably has an average particle diameter of 1 μm or less, and more preferably has an average particle diameter of 0.7 μm or less. The particle diameter of the resin particles is substantially the same size as the wavelength of visible light, whereby diffraction scattering also occurs in addition to scattering resulting from reflection by the liquid crystal molecules and geometrical scattering resulting from the difference between the refractive indices, and multiple instances of diffraction scattering occur due to the resin-particle aggregate. Therefore, the scattering intensity further increases and a high-contrast visible-light projected image can be formed.

Light is scattered to a greater extent as the particle diameter of the resin particles decreases. Therefore, the substantial lower-limit value of the average particle diameter is about 0.1 µm, although the lower-limit value is not particularly limited.

The resin particles preferably have refractive anisotropy. The polymer constituting the resin particles assumes a cord form in which each of the molecules is nano-sized. In an irregular state (amorphous state), the polymer particles assume a bent coil form and serve as a medium that is uniform for light due to having no directionality. However, in cases where the molecular structure has a structure including functional groups of a planar structure, as exemplified by a biphenyl structure that shall be described later, the polymer molecules are arranged, i.e., oriented, in a direction that follows the planar structure. In an oriented state, a refractive index with respect to linearly polarized light that is polarized in an orientation direction (n/) and a refractive index with respect to linearly polarized light that is polarized in a direction orthogonal to the orientation direction (n⊥) are different from each other. The characteristic by which the refractive indices differ depending on the polarization plane in this manner is referred to as refractive anisotropy or birefringence, the magnitude of the birefringence being expressed by Δn=n/−n⊥. The resin particles have refractive anisotropy, whereby the refractive index of the optical function layer in an in-plane direction and the refractive index of the optical function layer in a thickness direction differ from one another. Additionally, the difference between the refractive indices of the liquid crystal molecules in the in-plane direction is greater than the refractive index with the liquid crystal molecules in the thickness direction, whereby the scattering intensity at the liquid crystal molecule-resin interface is high in the screen state, while transparency improves due to the scattering intensity at the liquid crystal molecule-resin interface decreasing to allow light to be more readily transmitted in the transparent state.

4,4'-bis[6-(acryloyloxy)hexyloxy]biphenyl has a biphenyl structure in the molecular structure thereof, and the biphenyl structure is one in which two phenyl groups of the planar structure are bonded together, the biphenyl structure having refractive anisotropy due to being oriented in the direction that follows the planar structure. Therefore, the polymer including the biphenyl structure also has refractive anisotropy.

IRGACURE 819 (made by IGM Resins B.V.) can be used as the polymerization initiator.

Glass, resin, or the like can be used for the transparent substrates, and an ITO film or the like can be used for transparent electrodes employed when the electrical field is applied to the optical function layer.

The liquid crystal optical element of the present invention can also have an ultraviolet-light-blocking layer, as necessary. The ultraviolet-light-blocking layer blocks ultraviolet light that is incident from the rear-surface side of the optical function layer, the ultraviolet-light-blocking layer being a transparent film containing an ultraviolet radiation absorber or an ultraviolet light reflector.

The ultraviolet radiation absorber to be used can be one that is well known in the prior art, having little coloration and absorbing light in the ultraviolet section at a wavelength of 400 nm or less without absorbing light in the visible section. Examples of the ultraviolet radiation absorber include benzophenone derivatives, salicylic acid ester derivatives, triazole derivatives, and acrylonitrile derivatives. Examples of the ultraviolet light reflector include titanium oxide and zinc oxide.

The liquid crystal optical element of the present invention can, for example, be used in front windshields of automobiles or in store windows, and can be switched between the screen state in which a visible-light image can be projected and displayed and the transparent state in which a facing side can be visually confirmed.

The present invention is described in greater detail below through use of examples but is not limited to the examples below.

Example 1

83.8 parts by mass of liquid crystal molecules (nematic liquid crystals: E44, made by Merck), 8 parts by mass of an optically active material obtained by mixing an azobenzene compound (photoisomerization material) expressed by structural formula (5) and 4-[4-(hexyloxy)benzoyloxy]benzoic acid(R)-2-octyl (R-811, made by Merck, non-photoreactive chiral compound) at a mass ratio of 5.1:4.9, 7.5 parts by mass of a photopolymerizable monomer (4,4'-bis[4-{6-(acryloyloxy)hexyloxy}benzoate]-1,1'-biphenylene, which is a liquid-crystalline resin), and 0.7 parts by mass of a photopolymerization initiator (IRGACURE 819, made by IGM Resins B.V.) were mixed to formulate a liquid crystal composition.

A perpendicularly oriented film (polyimide) was formed over the entirety of one surface of transparent glass, two transparent substrates were disposed so that the perpendicularly oriented film was located therebetween, and the liquid crystal composition was injected between the two transparent substrates under heating and irradiated with ultraviolet radiation to polymerize the photopolymerizable monomer and obtain a liquid crystal optical element. An AC voltage of 50 V was applied between the transparent substrates during polymerization, whereby the orientations of the photopolymerizable monomer and the liquid crystal molecules were aligned in a voltage-application direction.

Example 2

A liquid crystal optical element was obtained in the same manner as in Example 1, except that 85.4 parts by mass of the liquid crystal molecules of Example 1, 8 parts by mass of the optically active material of Example 1, 5 parts by mass of the photopolymerizable monomer (liquid-crystalline resin) of Example 1, 1 part by mass of NOA65 (made by Norland) that serves as a photopolymerizable monomer (non-liquid-crystalline resin), and 0.6 parts by mass of the photopolymerization initiator of Example 1 were mixed to formulate a liquid crystal composition, and the liquid crystal composition was used.

Example 3

A liquid crystal optical element was obtained in the same manner as in Example 1, except that 86.4 parts by mass of the liquid crystal molecules of Example 1, 8 parts by mass of the optically active material of Example 1, a total of 5 parts by mass including 2 parts by mass of the 4,4'-bis[4-{6-(acryloyloxy)hexyloxy}benzoate]-1,1'-biphenylene of Example 1 and 3 parts by mass of the 4,4'-bis[6-(acryloyloxy)hexyloxy]biphenyl that served as photopolymerizable monomers (liquid-crystalline resin), and 0.6 parts by mass of the photopolymerization initiator of Example 1 were mixed to formulate a liquid crystal composition, and the liquid crystal composition was used.

Example 4

A liquid crystal optical element was obtained in the same manner as in Example 1, except that 86.4 parts by mass of the liquid crystal molecules of Example 1, 8 parts by mass of the optically active material of Example 1, a total of 5 parts by mass including 4.5 parts by mass of the 4,4'-bis[4-{6-(acryloyloxy)hexyloxy}benzoate]-1,1'-biphenylene of Example 1 and 0.5 parts by mass of the 6-[{4'-cyano-(1,1'-biphenyl)-4-yl}oxy]hexyl acrylate that served as photopolymerizable monomers (liquid-crystalline resin), and 0.6 parts by mass of the photopolymerization initiator of Example 1 were mixed to formulate a liquid crystal composition, and the liquid crystal composition was used.

Comparative Example

A liquid crystal optical element was obtained in the same manner as in Example 1, except that: the photopolymerizable monomer was changed to 2,3,5,6-tetrafluoro-1,4-phenylene-bis[4-{6-(acryloyloxy)hexyloxy}benzoate]; 83.8 parts by mass of the liquid crystal molecules of Example 1, 8 parts by mass of the optically active material of Example 1, 7.5 parts by mass of the photopolymerizable monomer, and 0.7 parts by mass of the photopolymerization initiator of Example 1 were mixed to formulate a liquid crystal composition; and the liquid crystal composition was used.

Figure 2:
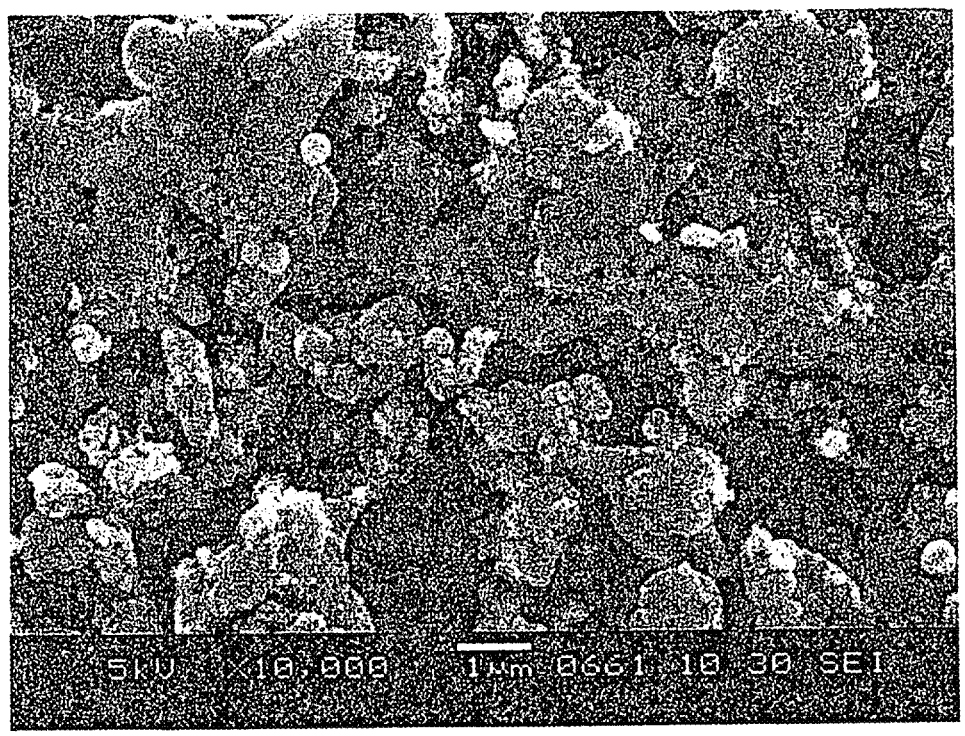
FIG. 2 is a SEM image of a mesh structure of a liquid crystal optical element according to Example 1.
Figure 3:
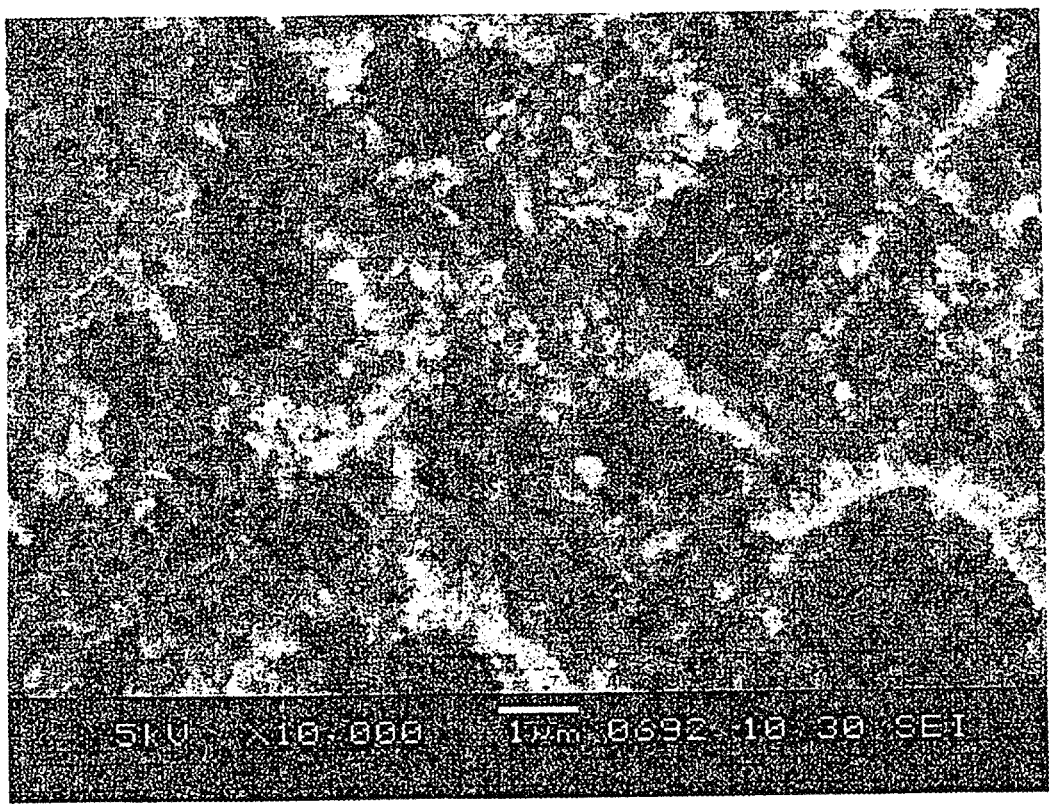
FIG. 3 is a SEM image of a mesh structure of a liquid crystal optical element according to Example 2.
Figure 4:
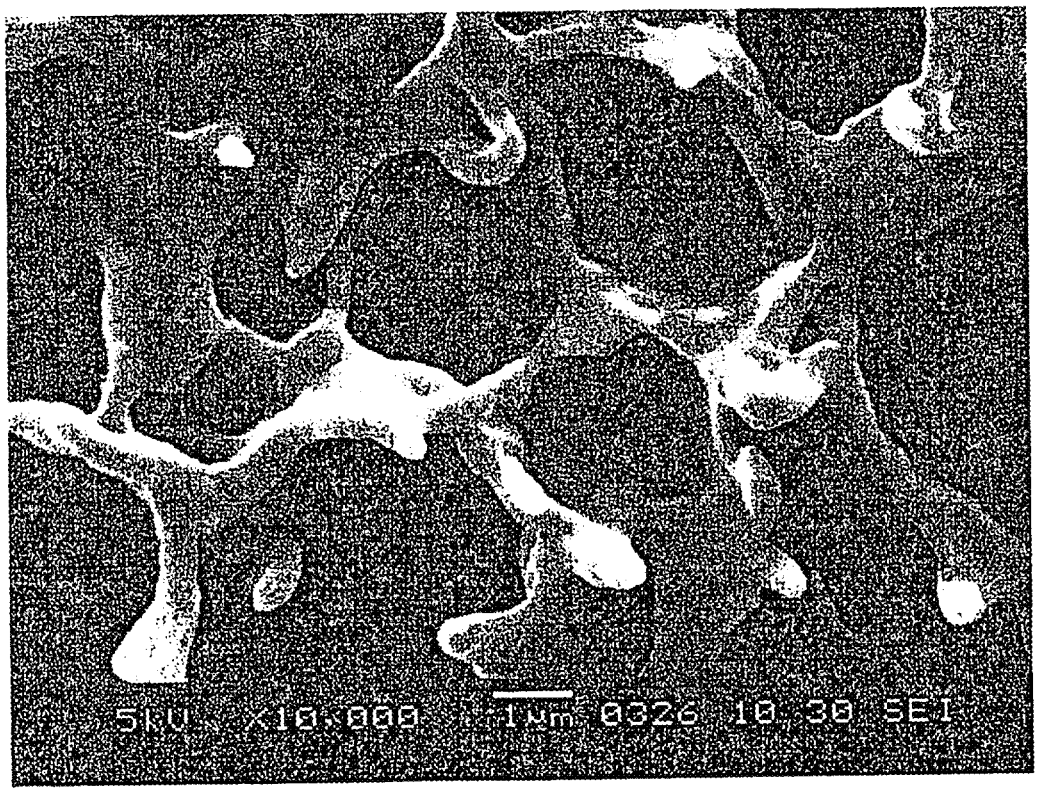
FIG. 4 is a SEM image of a mesh structure of a liquid crystal optical element according to comparative Example 1.

The mesh structure of the liquid crystal optical element was observed using a SEM, and the average particle diameter of the resin particles was measured. SEM images of Examples 1 and 2 and the comparative example are shown in FIGS. 2 to 4. Table 1 shows the configurations of Examples 1 to 4 and the comparative example, and table 2 shows the results of observation and measurement.

In Examples 1 and 2, a three-dimensional mesh structure was formed of the resin-particle aggregate, and the average particle diameter of the resin particles was 1 μm in the former and 0.5 μm in the latter. In the results obtained from similarly observing Examples 3 and 4, the average particle diameter of the resin particles was 0.5 μm. In the comparative example, the mesh structure was formed of a rod-form resin, the mesh structure had a smooth surface, and no resin particles were observed.

Figure 5:
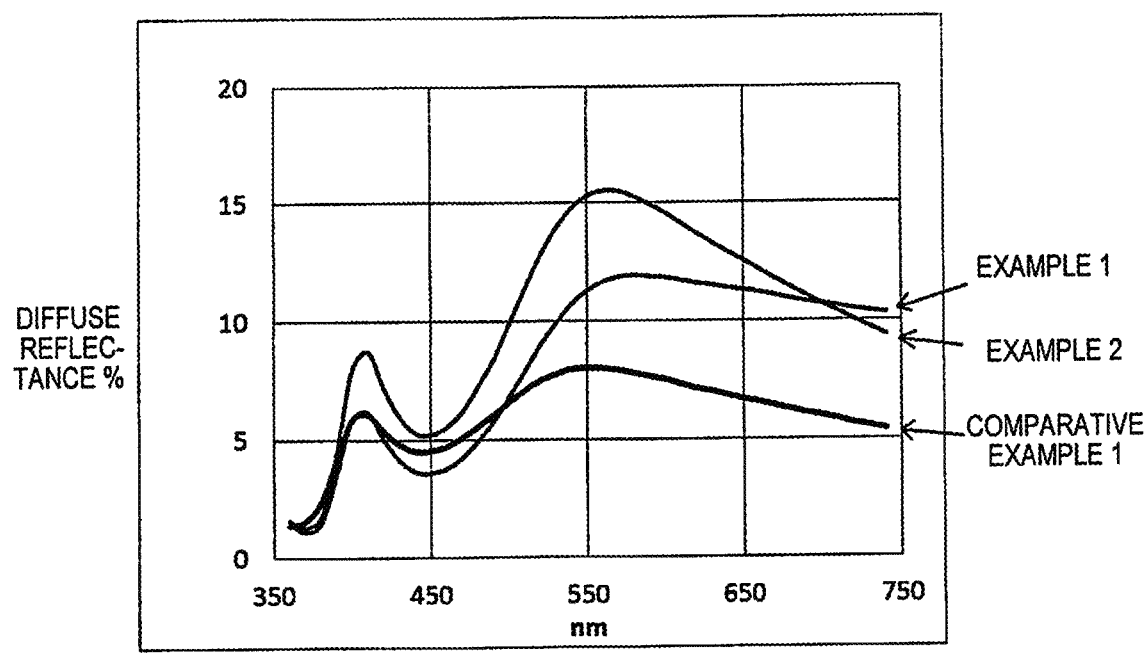
FIG. 5 is a graph showing diffuse reflectance of the liquid crystal optical elements according to the examples and the comparative example.

Diffuse reflectance SCE of a visible-light region was measured using a CM3600A spectrophotometer (made by Konica Minolta). FIG. 5 shows a relationship between the wavelength of light and the diffuse reflectance in Examples 1 and 2 and the comparative example. The diffuse reflectance of visible light for Examples 1 to 4 and the comparative example was 11.3%, 15.3%, 15.0%, 15.0%, and 8.0%, respectively. If the diffuse reflectance in the visible-light region increases, then light (i.e., background light) that is incident from the side opposite from the side onto which the visible light is projected will not readily be transmitted to the side onto which the visible light is projected, and the intensity of the background light seen from the side onto which the visible light is projected will decrease. Therefore, as a result of there being less of an effect from the brightness in the environment, a high-contrast projected image can be formed even in bright environments (where contrast=(image light intensity+background light intensity)/background light intensity).

From FIG. 5, the liquid crystal optical element of the present invention is understood to have high diffuse reflectance in the visible-light region and to be capable of forming a high-contrast visible image.

TABLE 1

| Constituent materials | | Specifications (substance name, manufacturer name) | Example 1, Parts By Mass | Example 2, Parts By Mass | Example 3, Parts By Mass | Example 4, Parts By Mass | Comparative Example, Parts By Mass |
|---|---|---|---|---|---|---|---|
| Liquid crystal molecules | | E44 (made by Merck) | 83.8 | 85.4 | 86.4 | 86.4 | 83.4 |
| Optically active material | Photoisomerization material | Azobenzene compound having chemical structure (5) | 4.08 | 4.08 | 4.08 | 4.08 | 4.08 |
| | Non-photoreactive chiral compound | 4-[4-(hexyloxy)benzoyloxy]benzoic acid(R)-2-octyl | 3.92 | 3.92 | 3.92 | 3.92 | 3.92 |
| Photopolymerizable monomer | Liquid-crystalline resin | 4,4'-bis[4-{6-(acryloyloxy)hexyloxy}benzoate]-1,1'-biphenylene | 7.5 | 7 | 2 | 4.5 | |
| | | 4,4'-bis[6-(acryloyloxy)hexyloxy]biphenyl | | | 3 | | |
| | | 6-{[4'-cyano-(1,1'-biphenyl)-4-yl]oxy}hexyl acrylate | | | | 0.5 | |
| | Resin | 2,3,5,6-tetrafluoro-1,4-phenylene-bis[4-{6-(acryloyloxy)hexyloxy}benzoate] | | | | | 7.5 |
| | Non-liquid-crystalline resin | NOA65 (made by Norland) | | | 1 | | |
| Photopolymerization initiator | | IRGACURE 819 (made by IGM Resins B.V.) | 0.7 | 0.6 | 0.6 | 0.6 | 0.7 |
| Total component count | | | 100 | 100 | 100 | 100 | 100 |

TABLE 2

| Results of observation and measurement | Example 1 | Example 2 | Example 3 | Example 4 | Comparative example |
|---|---|---|---|---|---|
| Surface | Particulate form | Particulate form | Particulate form | Particulate form | Non-particulate form |
| Average particle diameter of resin particles (μm) | 1 | 0.5 | 0.5 | 0.5 | No particles |

TABLE 2-continued

| Results of observation and measurement | Example 1 | Example 2 | Example 3 | Example 4 | Comparative example |
|---|---|---|---|---|---|
| Refractive anisotropy of resin | Yes | Yes | Yes | Yes | Yes |
| Biphenyl structure of resin monomer | Yes | Yes | Yes | Yes | No |
| Diffuse reflectance (%) | 11.3 | 15.3 | 15.0 | 15.0 | 8.0 |

The invention claimed is:

1. A liquid crystal optical element comprising two transparent substrates sandwiching an optical functional layer,
   the optical function layer containing liquid crystal molecules and a photoisomerization material, and
   the liquid crystal optical element switching between a light-transmitting state and a light-scattering state depending on an orientation state of the liquid crystal molecules, wherein
   the optical function layer holds the liquid crystal molecules and the photoisomerization material within a mesh structure formed of a resin-particle aggregate, and
   the resin particles have a part derived from 4,4'-bis[4-{6-(acryloyloxy)hexyloxy}benzoate]-1,1'-biphenylene.

2. The liquid crystal optical element according to claim 1, wherein
   the resin particles have an average particle diameter of 1 µm or less.

3. The liquid crystal optical element according to claim 1, wherein
   the resin particles have an average particle diameter of 0.7 µm or less.

4. The liquid crystal optical element according to claim 1, wherein
   the resin particles have refractive anisotropy.

5. The liquid crystal optical element according to claim 1, wherein
   the resin particles have a biphenyl structure within a molecular structure thereof.

* * * * *